US012613257B2

(12) United States Patent
Arai et al.

(10) Patent No.: US 12,613,257 B2
(45) Date of Patent: Apr. 28, 2026

(54) PROBE ASSESSMENT METHOD AND SPM

(71) Applicant: SHIMADZU CORPORATION, Kyoto (JP)

(72) Inventors: Hiroshi Arai, Kyoto (JP); Hideo Nakajima, Kyoto (JP); Kenji Yamasaki, Kyoto (JP); Eiji Iida, Kyoto (JP); Akinori Kogure, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 427 days.

(21) Appl. No.: 18/268,299

(22) PCT Filed: Jun. 9, 2021

(86) PCT No.: PCT/JP2021/021849
§ 371 (c)(1),
(2) Date: Jun. 19, 2023

(87) PCT Pub. No.: WO2022/137600
PCT Pub. Date: Jun. 30, 2022

(65) Prior Publication Data
US 2024/0069064 A1      Feb. 29, 2024

(30) Foreign Application Priority Data
Dec. 21, 2020      (JP) ................................. 2020-211165

(51) Int. Cl.
G01Q 40/02          (2010.01)
(52) U.S. Cl.
CPC ................................... G01Q 40/02 (2013.01)

(58) Field of Classification Search
CPC ..................................................... G01Q 40/02
See application file for complete search history.

(56) References Cited

U.S. PATENT DOCUMENTS

2013/0180019 A1*   7/2013   Watanabe .............. G01Q 70/10
                                                               850/57

FOREIGN PATENT DOCUMENTS

JP          2006308312 A      11/2006
JP            5902485 B2      4/2016

OTHER PUBLICATIONS

"Test method for surface roughness of ceramic thin films by atomic force microscopy", Japanese Industrial Standards Committee (JIS) R1683 section 8, appendixes A, B, Oct. 20, 2014.
PCT Written Opinion of the International Searching Authority for PCT application No. PCT/JP2021/021849 dated Aug. 31, 2021.

* cited by examiner

*Primary Examiner* — Nicole M Ippolito
(74) *Attorney, Agent, or Firm* — Muir Patent Law, PLLC

(57)                    ABSTRACT
A method of assessing a probe by measuring a known sample whose shape is known with the probe in an electronic microscope, the known sample having a projection part on a surface thereof, and the projection part having a shape tapered toward a vertex thereof, the method comprising a step of measuring circle equivalent radius of the projection part, a step of comparing the circle equivalent radius with a first threshold value, and a step of determining that the probe is satisfactory when the width is less than the first threshold value, and a step of determining that the probe is unsatisfactory when the width is equal to or greater than the first threshold value.

15 Claims, 9 Drawing Sheets

| Type of Cantilever | First threshold value |
|---|---|
| Cantilever 2A | PA |
| Cantilever 2B | PB |
| Cantilever 2C | PC |
| ⋮ | ⋮ |

(A)

(B)

PROBE ASSESSMENT METHOD AND SPM

TECHNICAL FIELD

The present invention relates to a probe assessment method and an SPM.

BACKGROUND ART

In an SPM (Scanning Probe Microscope), a probe is provided at a tip of a cantilever, the probe is brought close to a sample to acquire information on a surface of the sample, and an observation image is generated based on the information. When the SPM is used for a long period of time, the tip of the probe gradually wears. The SPM cannot accurately generate an observation image when the wear amount of the probe increases. Therefore, it is preferable that the user of the SPM periodically observe the state of the tip of the probe to evaluate whether the wear amount of the probe is within an allowable range.

Japanese Patent No. 5902485 (Patent Document 1) discloses a technique for calculating a curvature radius of a probe by measuring a known sample in an SPM. On the known sample, a projection part having a curvature radius of 10 nm or less is formed. The SPM generates an observation image showing projection parts by measuring the known sample. The SPM measures a plurality of combinations of a distance from a tip of one projection part shown by the observation image and a width of the projection part at a position defined by the distance and calculates the curvature radius of the probe based on the plurality of combinations.

PRIOR ART DOCUMENT

Patent Document

Patent Document 1: Japanese Patent No. 5902485

SUMMARY OF THE INVENTION

Problems to be Solved by the Invention

For example, a user of an SPM can assess the probe based on the curvature radius of the probe calculated by the SPM described in Patent Document 1. However, in the SPM described in Patent Document 1, it is necessary to measure a plurality of combinations of the distance from the tip of one projection part and the width of the projection part measured at this distance. There may cause a problem that the arithmetic processing amount for assessing the probe increases.

The present invention has been made to solve the above-described problem, and an object of the present invention is to provide a technique for assessing a probe without increasing the arithmetic processing amount.

Means for Solving the Problems

A method according to one aspect of this disclosure is a method of assessing a probe by measuring a known sample whose shape is known with the probe in an SPM. The known sample has a projection part on a surface thereof. The projection part has a shape tapered toward a vertex thereof. the method comprises a step of measuring a width of the projection part at a position away from a measurement point of the vertex n a height direction by a predetermined distance. Further, the method includes a step of comparing the width with a threshold value. Further, the method includes a step of determining that the probe is satisfactory when the width is less than the threshold value and determining that the probe is unsatisfactory when the width is equal to or greater than the threshold value.

A method according to another aspect of this disclosure is a method of assessing a probe by measuring a known sample whose shape is known with the probe in an SPM. A groove part is formed on a surface of the known sample. The groove part has a shape tapered toward a bottom of the groove part. The method includes a step of measuring a width of the groove part at a position away from a measurement point on the bottom of the groove part in a depth direction by a predetermined distance. Further, the method includes a step of determining the width with a threshold value. Further, the method includes a step of determining that the probe is satisfactory when the width is less than the threshold value and determining that the probe is unsatisfactory when the width is equal to or greater than the threshold value.

A method according to another aspect of this disclosure is a method of assessing a probe by measuring a known sample whose shape is known with the probe in an SPM. A plurality of projection parts is formed on a surface of the known sample. Each of the plurality of projection parts has a shape tapered toward a vertex thereof. The method includes a step of measuring a width of each of the plurality of projection parts at a position away from the vertex in a height direction by a predetermined distance by relatively moving the probe along a surface of each of the plurality of projection parts. Further, the method includes a step of comparing the width of each of the plurality of projection parts with a threshold value. Further, the method includes a step of determining that the probe is satisfactory when a ratio of a number of the projection parts whose width is less than the threshold value to a number indicated by the plural is equal to or greater than a predetermined value and determining that the probe unsatisfactory when the ratio is less than the predetermined value.

A method according to another aspect of the present invention is a method of assessing a probe by measuring a known sample whose shape is known in an SPM. A plurality of groove parts is formed on a surface of the known sample. Each of the plurality of groove parts has a shape tapered toward a bottom. The method includes a step of measuring a width of each of the plurality of groove parts at a position away from the bottom in a depth direction by a predetermined distance. Further, the method includes a step of comparing the width of each of the plurality of groove parts with a threshold value. Further, the method includes a step of determining that the probe is satisfactory when a ratio of the number of groove parts whose width is less than the threshold value to the number indicated by the plurality is equal to or greater than a predetermined value and determining that the probe is unsatisfactory when the ratio is less than the predetermined value.

Effects of the Invention

According to the technique of this disclosure, the SPM measures the width of the projection part at a position away from the vertex of the projection part in the height direction by a predetermined distance or the width of the groove part at a position away from the bottom of the groove part in the depth direction by a predetermined distance. Then, the SPM determines that the probe is satisfactory when the width is less than the threshold value and determines that the probe is unsatisfactory when the width is equal to or greater than the threshold value. Therefore, since it is not necessary to measure a plurality of combinations of the height from the tip of one projection part and the width of the projection part measured at this height as in the related art, the probe can be assessed without increasing the processing amount.

BRIEF DESCRIPTION OF THE DRAWINGS

FIG. 1 is a diagram schematically showing a configuration of a microscope according to an embodiment.

FIG. 4 is one example of a functional block diagram of an information processing device.

EMBODIMENTS FOR CARRYING OUT THE INVENTION

Figure 2:
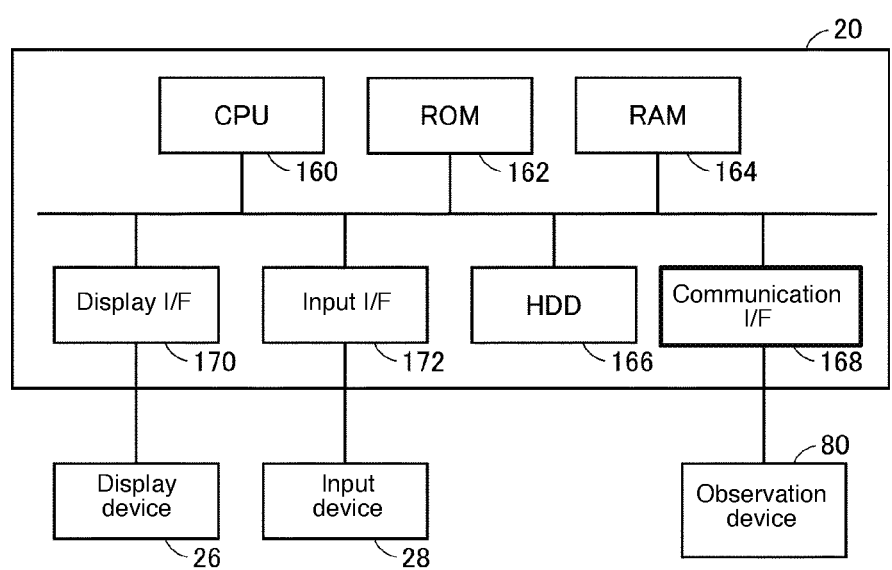
FIG. 2 is a diagram showing one example of a hardware configuration of an information processing device.

Hereinafter, some embodiments of the present invention will be described in detail with reference to the attached drawings. Note that in the following description, the same or corresponding portion in the drawings is assigned by the same reference symbol, and the description thereof will not be repeated in principle.

First Embodiment

[Configuration of Scanning Probe Microscope]

Figure 1:
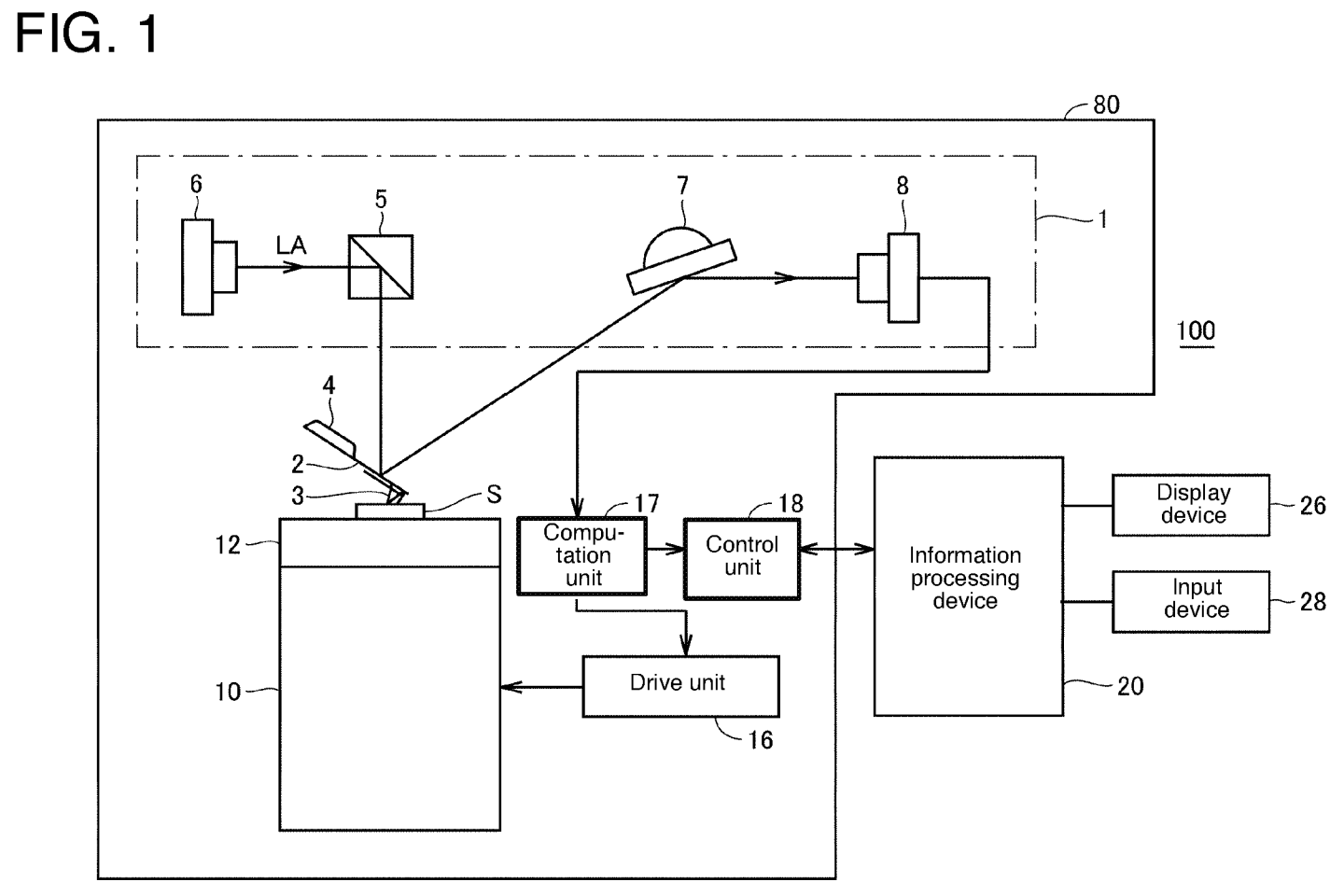

FIG. 1 is a diagram schematically showing a configuration of the SPM 100 according to an embodiment. The SPM 100 is an atomic force microscope (AFM) that observes the sample S by using the interatomic force (the attractive force or the repulsive force) acting between the probe and the surface of the sample S.

With reference to FIG. 1, the SPM 100 according to this embodiment is provided with, as main constitutional components, an observation device 80, an information processing device 20, a display device 26, and an input device 28. The observation device 80 includes, as main constitutional components, an optical system 1, a cantilever 2, a scanner 10, a sample holder 12, a drive unit 16, a computation unit 17, and a control unit 18.

The scanner 10 is a moving device for changing the relative positional relation between the sample S and the probe 3. The sample S is held on the sample holder 12 placed on the scanner 10. The scanner 10 includes an X-Y scanner that scans the sample S in two axial directions of the X-axis direction and the Y-axis direction orthogonal to each other, and a Z scanner that finely moves the sample S in the Z-axis direction. The X-Y scanner and the Z scanner are each configured by a piezoelectric element which is deformed by a voltage applied from the drive unit 16, and the scanner 10 scans in three dimensional directions (X-axis direction, Y-axis direction, and Z-axis direction) in accordance with the voltage applied to the piezoelectric element. With this, the SPM 100 can change the relative positional relation between the sample S placed on the scanner 10 and the probe 3.

The cantilever 2 has a front surface facing the sample S and a rear surface opposite to the front surface and is supported by the holder 4. The cantilever 2 has a probe 3 on the surface of the tip portion which is a free end. The probe 3 is arranged to face the sample S. The probe 3 moves along the surface of the sample S, and the cantilever 2 is displaced by the interatomic force acting between the probe 3 and the sample S.

An optical system 1 for detecting the displacement of the cantilever 2 in the Z-axis direction is provided above the cantilever 2. The optical system 1 irradiates the rear surface of the cantilever 2 with laser light and detects the laser light reflected by the rear surface of the cantilever 2 when observing the sample S. The optical system 1 includes a laser light source 6, a beam splitter 5, a mirror 7, and a photodetector 8.

The laser light source 6 includes a laser oscillator that emits laser light LA. The photodetector 8 includes a four-split photodiode that detects the incident laser light. The laser light LA emitted from the laser light source 6 is reflected by the beam splitter 5 and is emitted to the rear surface of the cantilever 2.

The cantilever 2 is formed of silicon, silicon nitride, or the like, and can reflect the laser light emitted from the optical system 1 on the rear surface of the cantilever 2. The laser light reflected on the rear surface of the cantilever 2 is further reflected by the mirror 7 and is incident on the photodetector 8. The displacement of the cantilever 2 can be detected by detecting the laser light with the photodetector 8.

In particular, the photodetector 8 has a light-receiving surface divided into a plurality (usually two) in the displacement direction (Z-axis direction) of the cantilever 2. Alternatively, the photodetector 8 has a light-receiving surface divided into four in the Z-axis direction and the Y-axis direction. When the cantilever 2 is displaced, the ratio of the amount of light emitted to the plurality of light receiving surfaces changes. The photodetector 8 outputs a detection signal corresponding to the plurality of received light amounts to the computation unit 17. When receiving the detection signal, the computation unit 17 calculates the displacement amount of the cantilever 2 based on the detection signal. The computation unit 17 controls the position of the sample S in the Z direction so that the interatomic force between the probe 3 and the surface of the sample S is always kept constant. The computation unit 17 calculates a voltage value for displacing the scanner 10 in the Z-axis direction based on the displacement amount of the cantilever 2 and outputs the voltage value to the scanner 10.

Further, the computation unit 17 outputs the detection signal to the control unit 18. The control unit 18 generates a control signal based on the detection signal and outputs the control signal to the information processing device 20. The control signal corresponds to the "measurement signal" of this disclosure.

The information processing device 20 is communicably connected to the control unit 18, the display device 26, and the input device 28. The information processing device 20 generates image data (profile data) based on a control signal from the control unit 18.

Based on the generated image data, the information processing device 20 displays an observation image on the display device 26. The observation image is an image showing the surface of the sample S. Further, the information processing device 20 controls the drive unit 16 via the control unit 18 to drive the scanner 10 in three dimensional directions.

The input device 28 receives an input operation of the user. The input device 28 outputs the signal corresponding to the user's operation content to the information processing device 20. The information processing device 20 outputs this signal to the control unit 18. The control unit 18 executes a control based on this signal on the observation device 80. The input device 28 may be a touch panel provided on the display device 26 or may be a physical operation key, such as, e.g., a dedicated operation button, a mouse, and a keyboard.

[Hardware Configuration of Information Processing Device]

FIG. 2 is a diagram showing one example of a hardware configuration of the information processing device 20. The information processing device 20 includes, as main constituent components, a CPU (Central Processing Unit) 160, a ROM (Read Only Memory) 162, a RAM (Random Access Memory (RAM) 164, an HDD (Hard Disk Drive) 166, a communication I/F (Interface) 168, a display I/F 170, and an input I/F 172. The constituent components are connected to each other via a data bus.

The communication I/F 168 is an interface for communicating with the observation device 80. The display I/F 170 is an interface for communicating with the display device 26. The input I/F 172 is an interface for communicating with the input device 28. The ROM 162 stores programs to be executed in the CPU 160. The RAM 164 can temporarily store data generated by executing the program in the CPU 160 and data input via the communication I/F 168. The RAM 164 can function as a temporary memory used as a work area. The HDD 166 is a non-volatile storage device. Further, a semiconductor storage device, such as, e.g., a flash memory, may be adopted instead of the HDD 166.

The program stored in the ROM 162 may be a program stored in a recording medium and distributed as a program product. Further, the program may be provided by an information provider as a so-called program product that can be downloaded via the Internet or the like. The information processing device 20 reads a program provided by a recording media or the Internet. The information processing device 20 stores the read program in a predetermined storage area (for example, ROM 162). The CPU 160 executes the stored program to perform the above-described display processing.

The recording media is not limited to a DVD-ROM (Digital Versatile Disk Read-Only Memory), a CD-ROM (Compact Disc Read-Only Memory), an FD (Flexible Disk), and a hard disk but may be a media fixedly carrying a program, such as, e.g., a magnetic tape, a cassette tape, an optical disc (MO (Magneto Optical disc)/MD (Mini Disc)/DVD (Digital Versatile Disc), an optical card, a mask ROM, an EPROM (Electronically Programmable Read-Only Memory), an EEPROM (Electronically Erasable Programmable Read-Only Memory), and a flash ROM. Further, the recording medium is a non-transitory medium from which a computer can read a program or the like. At least one of the ROM 162, the RAM 164, and the HDD 166 corresponds to the "memory" of this disclosure. That is, the memory stores information to be used by the information processing device.

[Assessment of Probe]

During the observation of the sample S by the observation device 80, the probe 3 and the sample S may come into contact with each other, and when the number of times of contact between the probe 3 and the sample S increases, wear of the tip of the probe 3 occurs. When the measurement of the sample S using the probe 3 is performed in a state in which the wear amount of the tip of the probe 3 has increased, accurate measurement cannot be performed. Therefore, it is preferable that the user of the SPM 100 or the SPM 100 periodically observe the state of the tip of the probe 3 to assess whether the wear amount of the probe is within an allowable range.

In the SPM 100 of this disclosure, it is possible to switch between a measurement mode in which an unknown sample is measured and an assessment mode in which a probe is assessed. When the user performs a predetermined operation on the input device 28, the mode of the SPM 100 is switched to the assessment mode. In the assessment mode, the observation device 80 measures a known sample whose shape is known and transmits the detection signal indicating this measurement result to the information processing device 20. The known sample is composed of N (N is an integer of 2 or more) pieces of unit samples, and each of the N pieces of unit samples has a projection part formed thereon. That is, N pieces of projection parts are formed on the surface of the known sample.

The information processing device 20 generates image data of the known sample based on the detection signal. The information processing device 20 can calculate a predetermined length of the known sample (for example, the width of the projection part of the known sample to be described later) by analyzing the image data.

Figure 3:
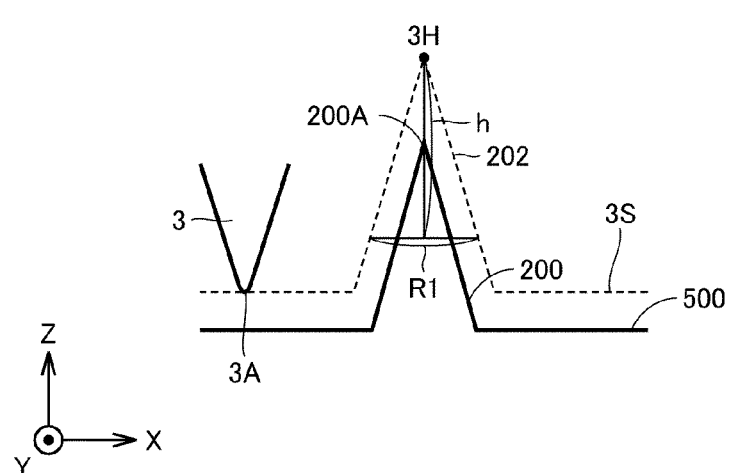
FIG. 3 is a diagram showing a cross-sectional view of a projection part formed on a known sample.
Figure 3:
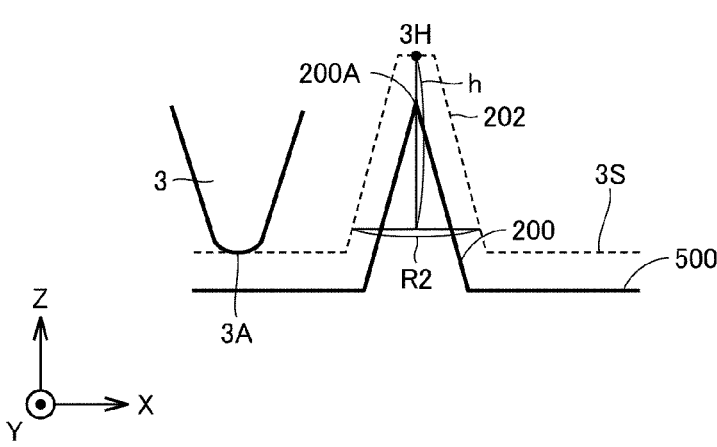

FIG. 3 is a diagram showing a cross-section of a projection part 200 formed on a known sample. In FIG. 3, the trajectory 3S of the probe 3 with respect to the projection part 200 is shown. (A) in FIG. 3 is a diagram showing the trajectory 3S when the tip 3A of the probe 3 has not been worn, and (B) in FIG. 3 is a diagram showing the trajectory 3S when the tip 3A of the probe 3 has been worn. When the tip 3A of the probe 3 has been worn, the curvature radius of the tip 3A increases. Note that in FIG. 3, since an interatomic force acts between the probe 3 and the known sample, a constant distance is maintained between the tip 3A of the probe 3 and the projection part 200.

In the example of FIG. 3, the height direction of the projection part 200 is defined as a Z-axis direction, and a plane perpendicular to the Z-axis direction is defined as an X-Y plane. The projection part 200 has a shape tapered toward the vertex 200A of the projection part 200. The projection part 200 has, for example, a conical shape. Note that the projection part 200 may have a triangular pyramid shape or a quadrangular pyramid shape.

In the assessment mode, the SPM 100 performs the measurement of the projection part 200. Therefore, the cross-section of the projection part 200 in the X-Y plane is approximated to a circular shape. The radius of the circular shape is hereinafter also referred to as "circle equivalent radius R." The "circle equivalent radius R of the projection part 200" corresponds to the "width of the projection part" of this disclosure.

The information processing device 20 measures the width (circle equivalent radius R) of the projection part 200 at the position away from the highest point 3H of the trajectory 3S of the projection part 200 in the height direction (Z-axis direction) toward the surface 500 of the known sample by a distance h by analyzing the image data of the projection part 200. The "highest point 3H of the trajectory 3S of the projection part 200" is a measurement point of the vertex 200A of the projection part 200 by the probe 3. The distance h is a predetermined value. The distance h may be input (set) by the user or may be a predetermined value.

The measured circle equivalent radius R is a value reflecting the curvature radius of the tip 3A of the probe 3. Here, the "value reflecting the curvature radius of the tip 3A" is any one of the value of the "curvature radius of the tip 3A," the value approximated to the value of the "curvature radius of the tip 3A," and the value obtained by multiplying the "curvature radius of the tip 3A" by a constant.

As shown in (A) in FIG. 3, the circle equivalent radius measured when the tip 3A of the probe 3 has not been worn is referred to as "circle equivalent radius R1." On the other hand, as shown in (B) in FIG. 3, the circle equivalent radius measured when the tip 3A of the probe 3 has been worn is referred to as "circle equivalent radius R2." Here, the highest point 3H of the trajectory 3S becomes lower (that is, the Z coordinate of the highest point 3H becomes smaller) in a case where the tip 3A of the probe 3 has been worn than in a case where the tip of the probe 3 has not been worn. Further, as described above, the projection part 200 has a shape tapered toward the vertex 200A thereof. Therefore, the circle equivalent radius R of the projection part 200 at the position away from the highest point 3H by a certain distance h becomes larger in a case where the tip 3A of the probe 3 has been worn than in a case where the tip 3A of the probe 3 has not been worn. Therefore, it becomes R2>R1.

That is, the more the tip 3A of the probe 3 is worn, the larger the measured circle equivalent radius R becomes. Therefore, the information processing device 20 compares the circle equivalent radius R of one projection part 200 out of the N pieces of the projection parts 200 with a predetermined first threshold value P. The information processing device 20 determines that the probe 3 is satisfactory when the circle equivalent radius R is less than the first threshold value P and determines that the probe 3 is satisfactory when the circle equivalent radius R is equal to or greater than the first threshold value P. The criterion for extracting one projection part 200 from the N pieces of projection parts 200 may be any criterion, and for example, the highest projection part 200 is extracted as one projection part 200.

For example, in the case of the SPM described in Patent Document 1, in order to calculate the curvature radius of the probe, it is necessary to measure a plurality of combinations of the height from the tip of the projection part and the width of the projection part measured at this height in the image of one projection part. Therefore, there may arise a problem that the arithmetic processing amount for assessing the probe increases.

On the other hand, in the SPM 100 of this disclosure, the probe 3 can be assessed based on the comparison between the measured circle equivalent radius R and the first threshold value P. Therefore, it is not necessary to measure a plurality of combinations of the height from the tip of the projection part and the width of the projection measured at the height like a conventional SPM. Therefore, the SPM 100 of this disclosure can assess the probe without increasing the arithmetic processing amount as compared with a conventional SPM.

[Functional Block Diagram of Information Processing Device]

Figure 4:
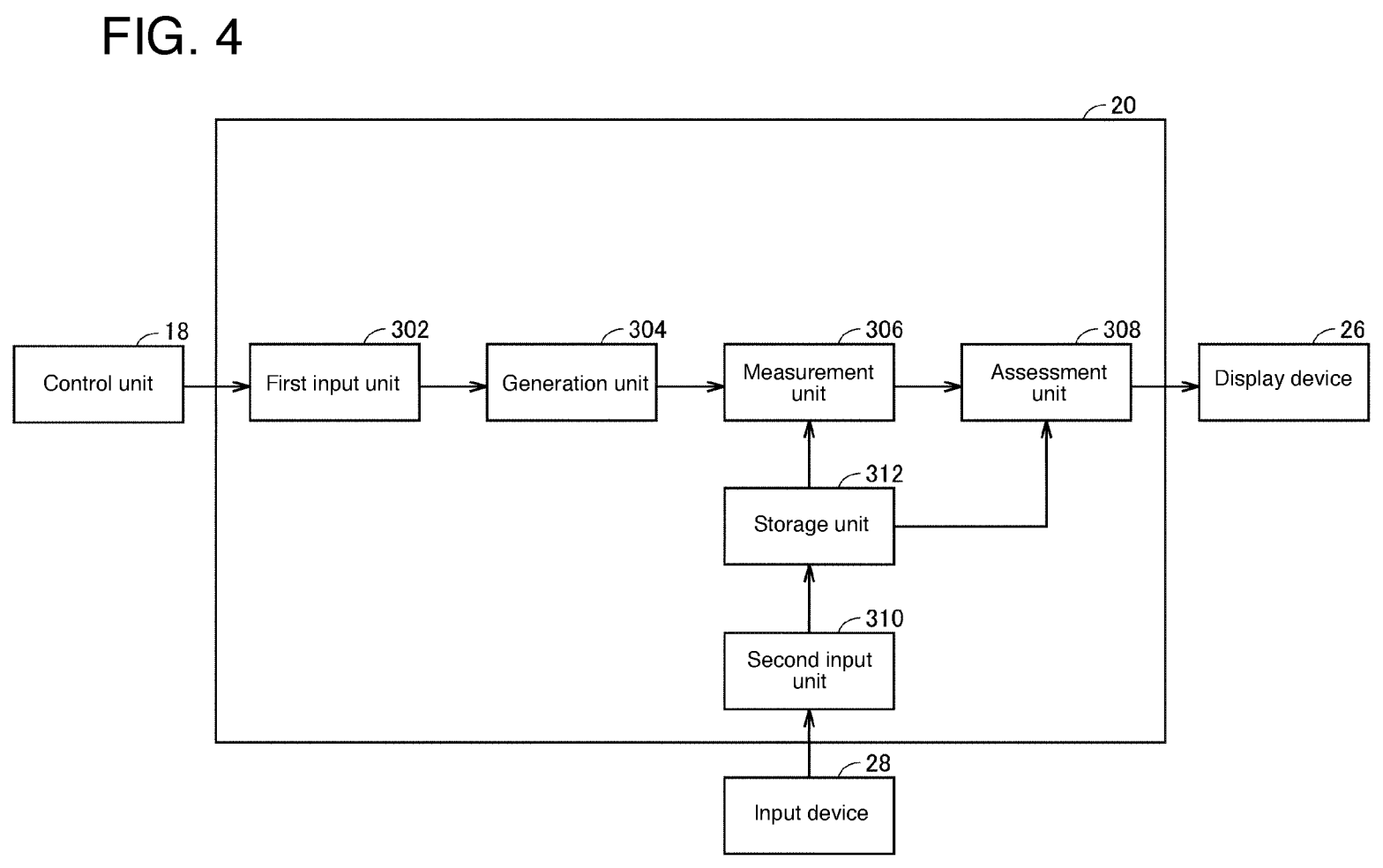

FIG. 4 is one example of a functional block diagram of the information processing device 20. The information processing device 20 includes a first input unit 302, a generation unit 304, a measurement unit 306, an assessment unit 308, a second input unit 310, and a storage unit 312.

The first input unit 302 receives an input of a detection signal from the photodetector 8 and outputs the detection signal to the generation unit 304. The generation unit 304 generates image data based on the detection signal and outputs the image data to the measurement unit 306.

Further, the user inputs a distance h (see FIG. 3) using the input device 28. The second input unit 310 receives the input of the distance h. The distance h is stored in the storage unit 312. Note that the first threshold value P has also been stored in advance in the storage unit 312.

The measurement unit 306 measures the circle equivalent radius R of the projection part 200 at a position away from the highest point 3H of the trajectory 3S of the projection part 200 in the Z-axis direction by the distance h, based on the image data generated by the generation unit 304. The measurement unit 306 outputs the measured circle equivalent radius R to the assessment unit 308.

The assessment unit 308 compares the circle equivalent radius R with the first threshold value P. The assessment unit 308 determines that the probe 3 is satisfactory when the circle equivalent radius R is less than the first threshold value P and determines that the probe 3 is unsatisfactory when the circle equivalent radius R is equal to or greater than the first threshold value P. The fact that the probe 3 is satisfactory means that the wear amount of the tip 3A of the probe 3 is small (see (A) in FIG. 3). On the other hand, the fact that the probe 3 is unsatisfactory means that the wear amount of the tip 3A of the probe 3 is large (see (B) in FIG. 3).

The assessment unit 308 displays the assessment result on the display device 26. For example, when the assessment result is satisfactory, the assessment unit 308 displays characters, such as, e.g., "Satisfactory" on the display device 26. On the other hand, when the assessment result is unsatisfactory, the assessment unit 308 displays characters, such as, "Unsatisfactory" on the display device 26.

[Flowchart of Information Processing Device]

Figures 5, 6:
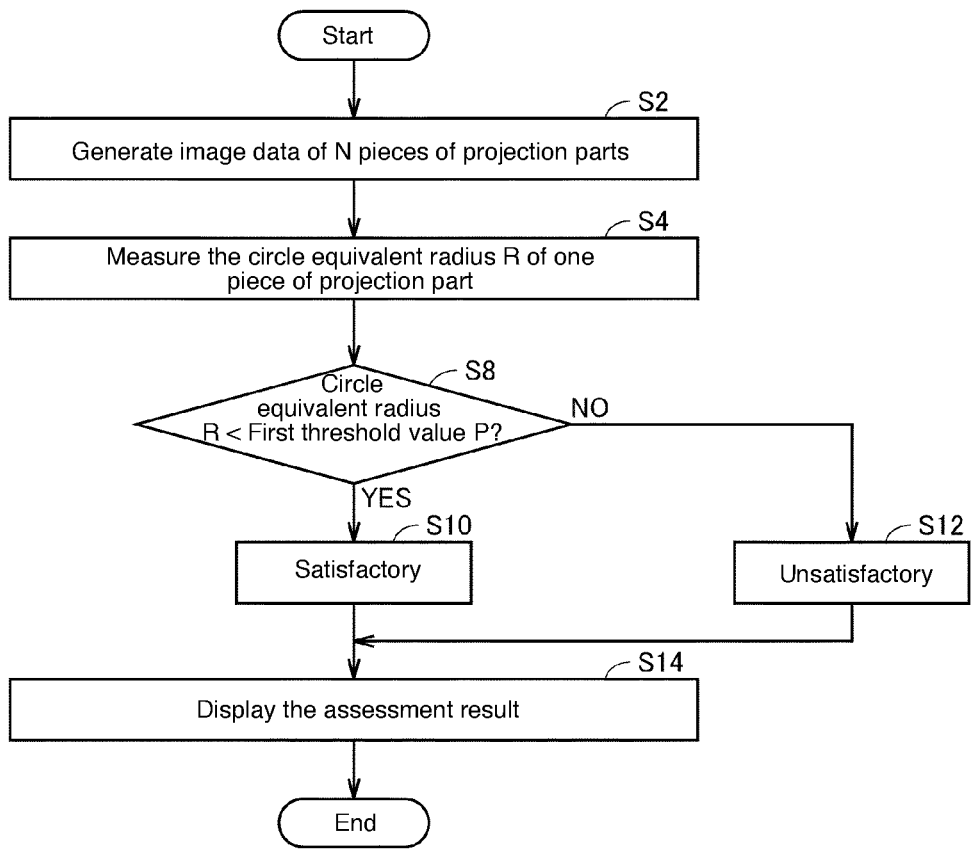
FIG. 5 is one example of a flowchart of an information processing device according to a first embodiment.
FIG. 6 is one example of a threshold value table showing a correspondence between a type of a cantilever and a first threshold value P.

FIG. 5 is one example of a flowchart of the information processing device 20. The processing of FIG. 5 is initiated when the mode is switched to an assessment mode.

First, in Step S2, the generation unit 304 generates image data of a known material including N pieces of projection parts, based on the detection signal from the observation device 80. Next, in Step S4, the generation unit 304 selects one projection part 200 from N pieces of projection parts 200 and measures the circle equivalent radius R of the projection part 200.

Next, in Step S8, the assessment unit 308 determines whether the circle equivalent radius R is less than a first threshold value P. When the circle equivalent radius R is less than the first threshold value P (YES in Step S8), in Step S10, the assessment unit 308 determines that the probe 3 is satisfactory. On the other hand, when the circle equivalent radius R is equal to or greater than the first threshold value P (NO in Step S8), in Step S12, the assessment unit 308 determines that the probe 3 is unsatisfactory. Next, in Step S14, the assessment unit 308 displays the assessment result on the display device 26.

As described above, the SPM 100 of this disclosure can assess the probe 3, based on the comparison between the measured circle equivalent radius R and the first threshold value P. Therefore, it is not necessary to measure a plurality of combinations of the height from the tip of the projection part and the width of the projection part measured at the height as in a conventional microscope. Therefore, the SPM 100 of this disclosure can assess the probe without increasing the arithmetic processing amount as compared with a conventional microscope.

Further, the information processing device 20 displays the assessment result on the display device 26. Therefore, the user can easily recognize the assessment result of the probe 3.

[First Threshold Value]

As described above, the cantilever 2 can be replaced by the user. Further, since the probe 3 is provided on the cantilever 2, the probe 3 is also replaced by replacing the cantilever 2. In general, the curvature radius of the tip 3A in a state in which the tip 3A has not been worn differs depending on the type of the probe 3. Further, as described above, the measured circle equivalent radius R is a value reflecting the curvature radius of the tip 3A of the probe 3. Therefore, the first threshold value P is set according to the probe 3 provided on the mounted cantilever 2.

FIG. 6 is one example of a threshold value table showing the correspondence between the type of the cantilever 2 (the type of the probe 3) and the first threshold value P. In the example of FIG. 6, a first threshold value PA is associated with the cantilever 2A, a first threshold value PB is associated with the cantilever 2B, and a first threshold value PC is associated with the cantilever 2C. In FIG. 6, the first threshold value is set to the same value as the curvature radius of the probe 3 provided on the cantilever 2. Note that the first threshold value may be set to a value slightly larger than the curvature radius of the probe 3 provided on the cantilever 2. The threshold value table is stored in the storage unit 312 in advance.

When the cantilever 2 is mounted by the user, the observation device 80 recognizes the type of the mounted cantilever 2 and transmits the type information indicating the type of the recognized cantilever 2 to the information processing device 20. When the information processing device 20 acquires the type information, the information processing device 20 refers to the threshold value table to set the first threshold value P (store the first threshold value P in the storage unit 312).

According to such a configuration, the SPM 100 can set an appropriate first threshold value P accordance to the type of the probe 3 (the type of the cantilever 2) to be assessed.

Further, a configuration may be adopted in which the first threshold value P can be set by the user. For example, it may be configured such that the user sets the first threshold value P by viewing a table (for example, the table shown in FIG. 6) in which the type of the cantilever 2 and the curvature radius (first threshold value P) of the probe 3 provided on the cantilever 2 are associated with each other. According to such a configuration, it is possible to set the first threshold value P desired by the user.

Second Embodiment

In the first embodiment, the configuration has been described in which the probe 3 is assessed by the comparison between the circle equivalent radius R of one projection part 200 out of N pieces of projection parts and the first threshold value P. In the second embodiment, the circle equivalent radius R of each of N pieces of projection parts is measured, and the probe 3 is assessed based on the ratio of the number of projection parts in which the circle equivalent radius R is less than the first threshold value P to the number N.

Figure 7:
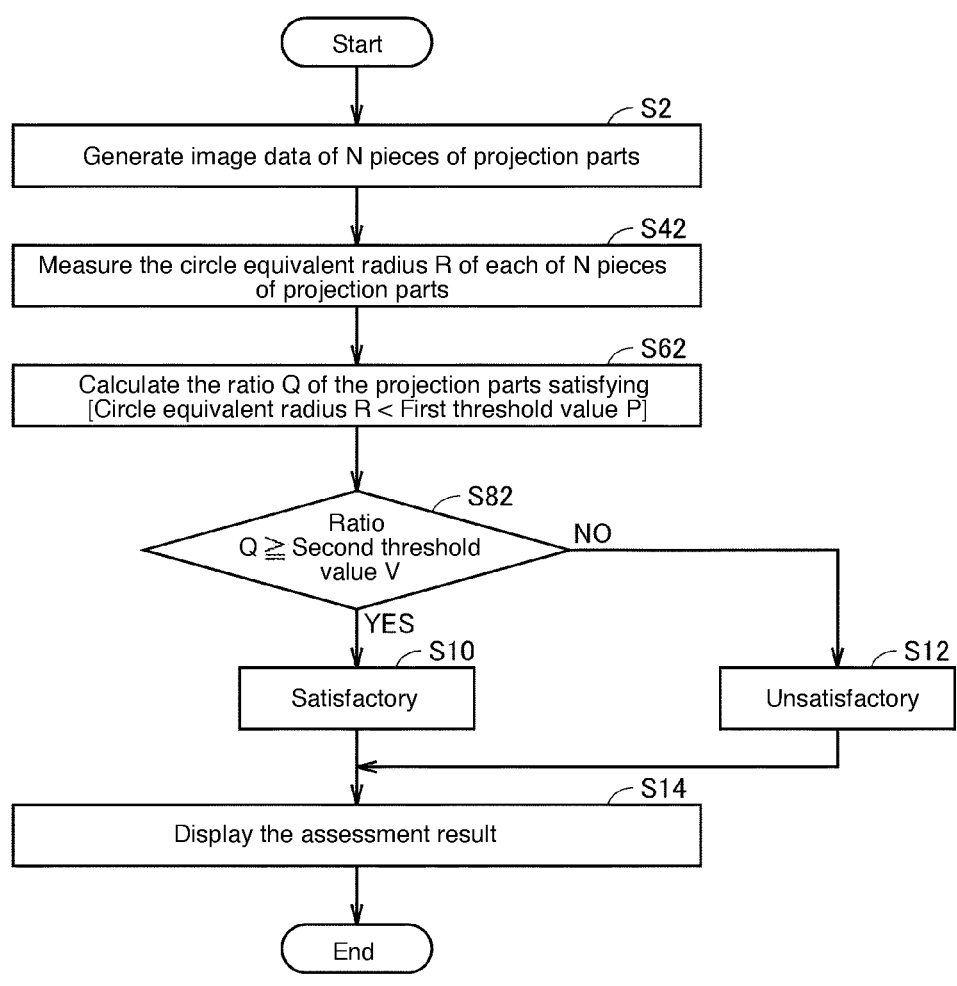
FIG. 7 is one example of a flowchart of an information processing device according to a second embodiment.

FIG. 7 is one example of a flowchart of the information processing device 20 of this embodiment. In the flowchart of FIG. 7, each of Step S4 and Step S8 of FIG. 5 is replaced with Step S42 and Step S82, and further, Step S62 is interposed between Step S42 and Step S82.

When the image data of N pieces of projection parts 200 is generated in Step S2, in Step S42, the measurement unit 306 measures the circle equivalent radius R of each of the N pieces of projection parts 200 based on the image data of N pieces of projection parts 200. The N pieces of circle equivalent radii R are output to the assessment unit 308.

Next, in Step S62, the assessment unit 308 measures the number C of the projection parts 200 in which the circle equivalent radius R is less than the first threshold value P. Further, in Step S62, the assessment unit 308 calculates a ratio Q of the measured value C to a value indicated by the total number N of the projection parts. That is, it becomes the ratio Q=C/N. Next, in Step S82, the assessment unit 308 determines whether the ratio Q is equal to or greater than a second threshold value V. The "second threshold value" of this embodiment corresponds to the "predetermined number" of this disclosure. Note that the second threshold value may be input (set) by the user or may be a predetermined value.

When the ratio Q is equal to or greater than the second threshold value V (YES in Step S82), the processing proceeds to Step S10. On the other hand, when the ratio Q is less than the second threshold value V (NO in Step S82), the processing proceeds to Step S12. The subsequent processing is the same as that in FIG. 5.

In the comparison between the circle equivalent radius R of only one projection part and the first threshold value P, the measured circle equivalent radius R may vary depending on the shape of the one projection part. Therefore, in this embodiment, when the ratio Q of the projection parts 200 in which the circle equivalent radius R is less than the first threshold value P is equal to or greater than the second threshold value V, it is determined that the probe 3 is satisfactory, and when the ratio Q is less than the second threshold value V, it is determined that the probe 3 is unsatisfactory. Therefore, it is possible to reduce the variation in the measured circle equivalent radius R, which in turn can improve the assessment accuracy.

Third Embodiment

In the above-described embodiments, the configuration has been described in which the SPM 100 assesses the probe 3 by measuring a known sample in which the projection part is formed. In the third embodiment, a configuration will be described in which the probe 3 is assessed by measuring a known sample in which a groove part is formed.

Figure 8:
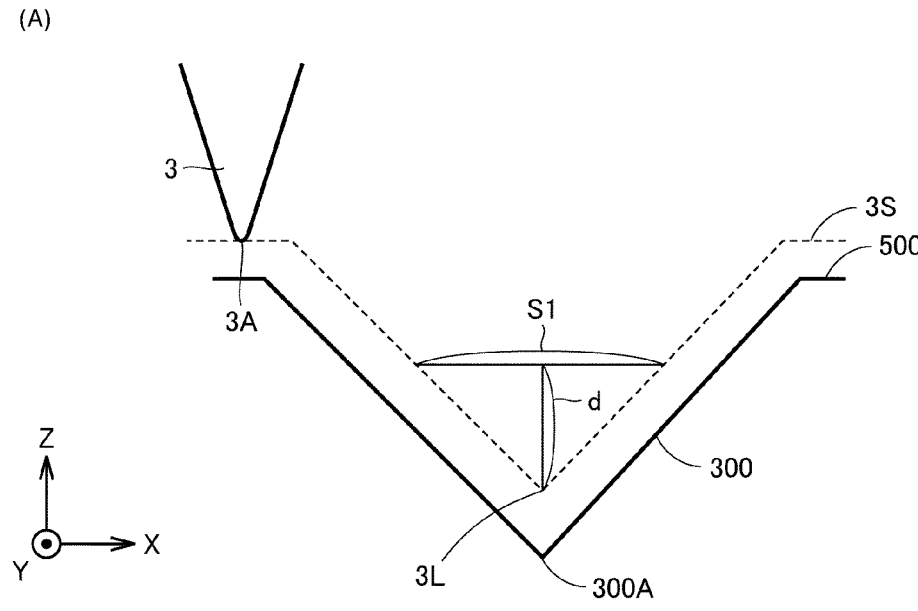
FIG. 8 is a diagram showing a cross-sectional view of a groove part formed on a known sample.
Figure 8:
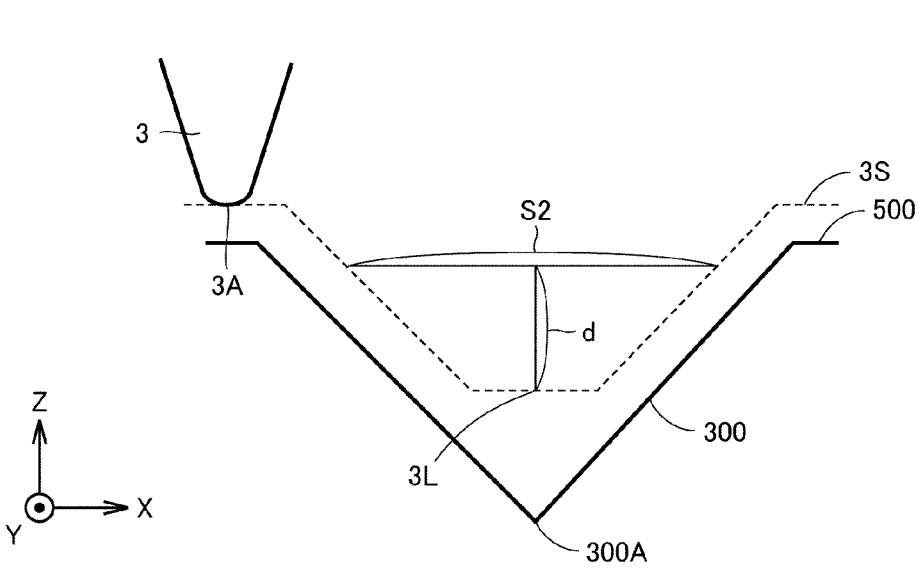

FIG. 8 is a diagram showing a cross-section of a groove part 300 formed in a known sample. A trajectory 3S of the probe 3 with respect to the groove part 300 is also shown. (A) in FIG. 8 is a diagram showing the trajectory 3S in a case where the tip 3A of the probe 3 has not been worn, and (B) in FIG. 8 is a diagram showing the trajectory 3S in a case where the tip 3A of the probe 3 has been worn. Note that in FIG. 8, since an interatomic force acts between the probe 3 and the known sample, a constant distance is maintained between the tip 3A of the probe 3 and the groove part 300. Note that it is assumed that the width of the opening portion of the groove part 300 is sufficiently larger than the tip 3A of the probe 3 regardless of the degree of wear of the tip 3A of the probe 3. Therefore, the SPM 100 can measure the shape of the groove part 300 even when the curvature radius of the tip 3A increases due to the wear of the tip 3A.

In the example of FIG. 8, the depth direction of the groove part 300 is defined as a Z-axis direction, and a plane perpendicular to the Z-axis direction is defined as an X-Y plane. The groove part 300 has a shape tapered toward the bottom 300A of the groove part 300. The space formed by the groove part 300 has, for example, a conical shape.

In the assessment mode, the SPM 100 performs the measurement of the groove part 300. Further, the cross-section of the space formed by the groove part 300 in the X-Y plane is approximated to a circular shape. The radius of the circular shape is hereinafter also referred to as a "circle equivalent radius S." The "circle equivalent radius S of the groove part 300" corresponds to the "width of the groove part" of this disclosure.

The information processing device 20 measures the width (circle equivalent radius R) of the groove part 300 at the distance h away from the lowest point 3L of the trajectory 3S of the groove part 300 in the depth direction (Z-axis direction) toward the surface 500 of the known sample by analyzing the image data of the groove part 300. The "lowest point 3L of the trajectory 3S of the groove part 300" is a measurement point of the bottom 300A of the groove part 300 by the probe 3.

Further, the measured circle equivalent radius S is a value corresponding to the curvature radius of the tip 3A of the probe 3. As shown in (A) in FIG. 8, the circle equivalent radius measured when the tip 3A of the probe 3 has not been worn is referred to as a "circle equivalent radius S1." On the other hand, as shown in (B) in FIG. 8, the circle equivalent radius measured when the tip 3A of the probe 3 has been worn is referred to as a "circle equivalent radius S2." Here, in a case where the tip 3A of the probe 3 has been worn, the curvature radius of the tip 3A is large. Therefore, the probe 3 cannot move to the lowermost portion of the groove part 300. Therefore, the lowest point 3L of the trajectory 3S is higher (that is, the Z coordinate of the lowest point 3L is larger) in a case where the tip 3A of the probe 3 has been worn than in a case where the tip 3A of the probe 3 has not been worn. Further, the groove part 300 has a shape tapered toward the bottom 300A of the groove part 300. Therefore, the circle equivalent radius S of the groove part 300 at the position away from the lowest point 3L by a certain distance h is larger in the case where the tip 3A of the probe 3 has been worn than in the case where the tip 3A of the probe 3 has not been worn. Therefore, it becomes S2>S1.

As described above, the more the tip 3A of the probe 3 is worn, the larger the measured circle equivalent radius S becomes. Therefore, the information processing device 20 compares the circle equivalent radius S of one groove part 300 out of N pieces of groove parts 300 with a predetermined first threshold value P and determines that the probe 3 is satisfactory when the circle equivalent radius S is less than the first threshold value P and determines that the probe 3 is unsatisfactory when the circle equivalent radius S is equal to or greater than the first threshold value P. In the SPM 100, the criterion for extracting one groove part 300 out of N pieces of groove parts 300 may be any criterion. The one groove part 300 is, for example, the deepest groove part out of the N pieces of groove parts 300.

Figure 9:
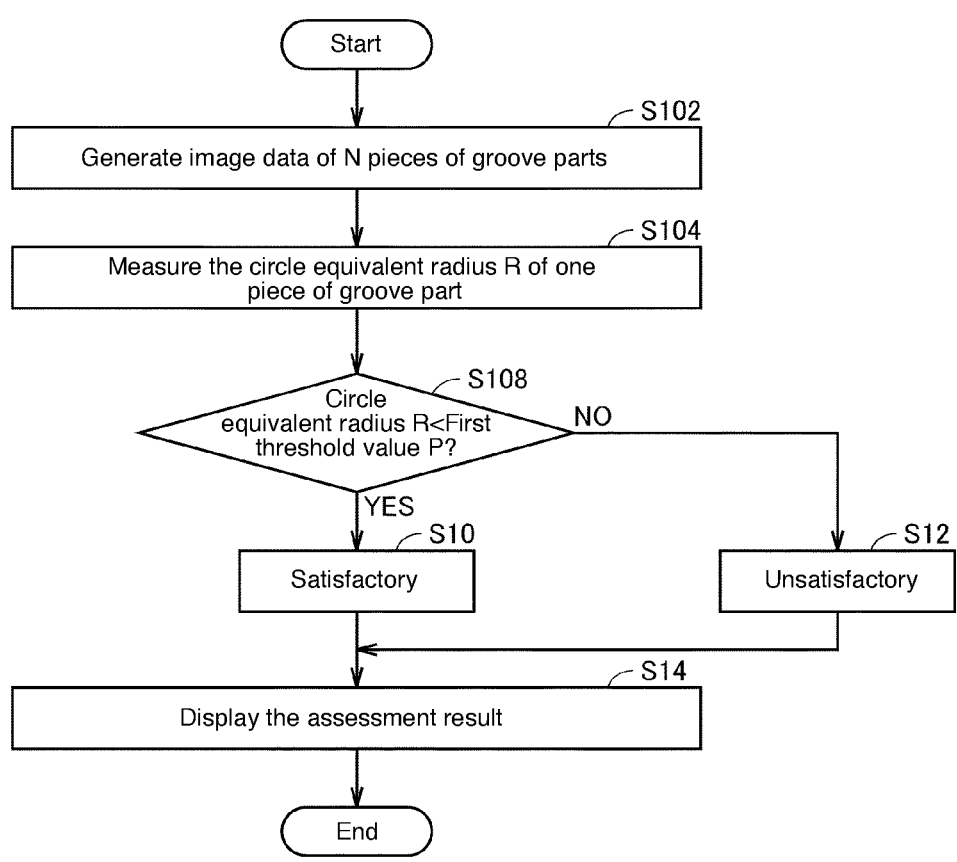
FIG. 9 is one example of a flowchart of an information processing device according to a third embodiment.

FIG. 9 is one example of a flowchart of the information processing device 20 of this embodiment. First, in Step S102, the generation unit 304 generates image data of the known material including N pieces of groove parts 300, based on the detection signal from the observation device 80. Next, in Step S104, the generation unit 304 selects one groove part 300 out of the N pieces of groove parts 300 and measures the circle equivalent radius S of the groove part 300.

Next, in Step S108, the assessment unit 308 determines whether the circle equivalent radius S is less than the first threshold value P. In a case where the circle equivalent radius S is less than the first threshold value P (YES in Step S108), the processing proceeds to Step S10. On the other hand, in a case where the circle equivalent radius S is equal to or greater than the first threshold value P (NO in Step S108), the processing proceeds to Step S12. The subsequent processing is the same as that in FIG. 5.

As described above, in the SPM 100 of this embodiment, the probe 3 can be assessed based on the comparison between the circle equivalent radius S of the groove part 300 and the first threshold value P.

Fourth Embodiment

In the third embodiment, a configuration has been described in which the probe 3 is assessed by comparing the circle equivalent radius S of one groove part 300 out of the N pieces of groove parts with the first threshold value P. In the fourth embodiment, the circle equivalent radius S of each of the N pieces groove parts is measured, and the probe 3 is assessed based on the ratio of the number of projection parts in which the circle equivalent radius S is less than the first threshold value P to the number N.

Figure 10:
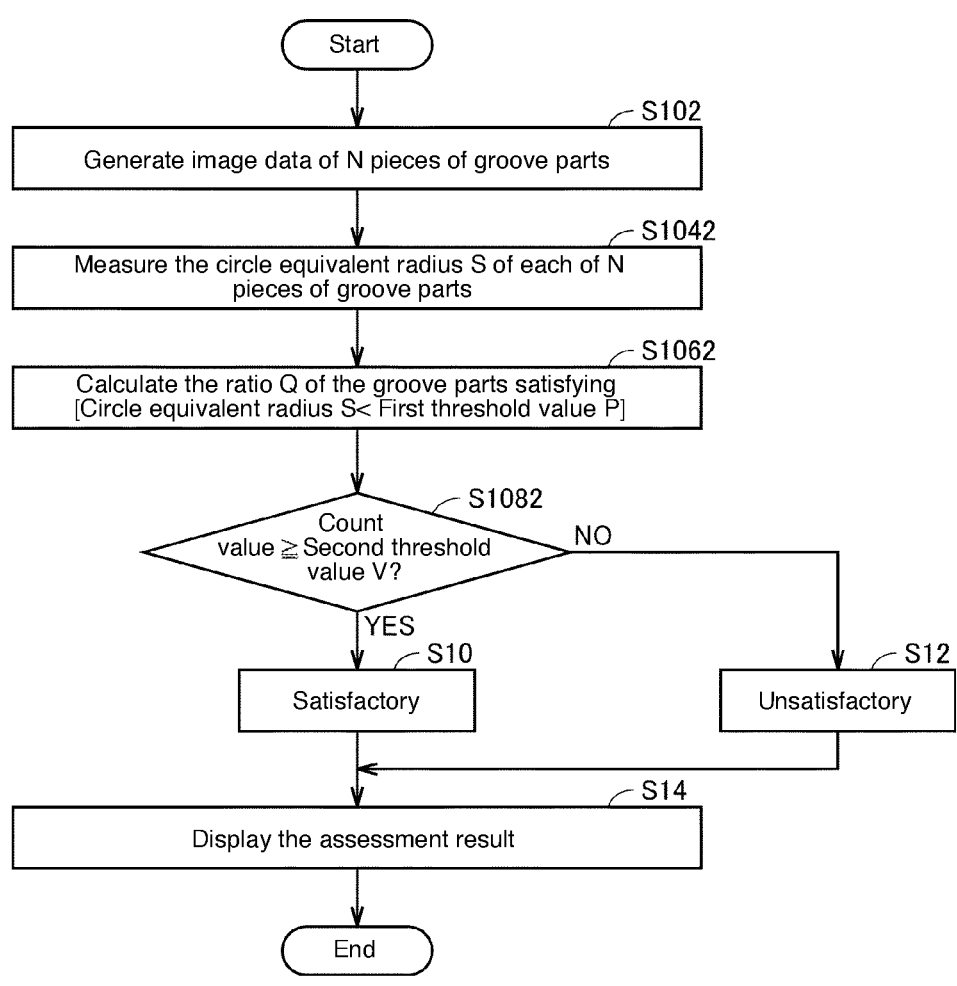
FIG. 10 is one example of a flowchart of an information processing device according to a fourth embodiment.

FIG. 10 is one example of a flowchart of an information processing device 20 of this embodiment. In the flowchart of FIG. 10, each of Step S104 and Step S108 of FIG. 9 is replaced with Step S1042 and Step S1082, and further, Step S1062 is interposed between Step S1042 and Step S1082.

When the image data of the N pieces of groove parts 300 is generated in Step S102, in Step S1042, the measurement unit 306 measures the circle equivalent radius S of each of the N pieces of groove parts 300, based on the image data of the N pieces of groove parts 300. The N pieces of circle equivalent radii S are output to the assessment unit 308.

Next, in Step S1062, the assessment unit 308 measures the number C of the groove parts 300 in which the circle equivalent radius S is less than the first threshold value P. Further, in Step S62, the assessment unit 308 calculates the ratio Q of the measurement value C to a value indicated by the total number N of the groove parts. That is, it is the ratio Q=C/N. Next, in Step S1082, the assessment unit 308 determines whether the ratio Q is equal to or greater than a second threshold value V.

When the ratio Q is equal to or greater than the second threshold value V (YES in Step S82), the processing proceeds to Step S10. On the other hand, when the ratio Q is less than the second threshold value V (NO in Step S82), the processing proceeds to Step S12. The subsequent processing is the same as that in FIG. 5.

In the comparison between the circle equivalent radius S of only one piece of groove parts and the first threshold value P, a variation in the measured circle equivalent radius S may occur depending on the shape of the one piece of the groove parts. Therefore, in this embodiment, in a case where the ratio Q of the groove parts 300 in which the circle equivalent radius S is less than the first threshold value P is equal to or greater than the second threshold value V, it is determined that the probe 3 is satisfactory, and when the ratio Q is less than the second threshold value V, it is determined that the probe 3 is unsatisfactory. Therefore, it is possible to reduce the variation in the measured circle equivalent radius S, which in turn can improve the assessment accuracy.

Note that it may be configured such that the user can select the assessment method of the probe 3 described in each of the above-described first to fourth embodiments. For example, in a case where it is configured to make the SPM 100 execute the assessment of the probe 3 using a known sample on which a projection part is formed, it may be configured such that the user can select the assessment method of the probe 3 described in the first embodiment or the assessment method of the probe 3 described in the second embodiment.

ASPECTS

It will be appreciated by those skilled in the art that the exemplary embodiments described above are examples of the following aspects.
(Item 1)
A method according to one aspect of the present invention is a method of assessing a probe by measuring a known sample whose shape is known with the probe in an SPM, the known sample having a projection part on a surface thereof, and the projection part having a shape tapered toward a vertex thereof,
the method comprising the steps of:
measuring a width of the projection part at a position away from a measurement point of the vertex in a height direction by a predetermined distance;
comparing the width with a threshold value, and
determining that the probe is satisfactory when the width is less than the threshold value and determining that the probe is unsatisfactory when the width is equal to or greater than the threshold value.
According to the method as recited in the above-described Item 1, it is possible to assess the probe without increasing the arithmetic processing amount.
(Item 2)
A method according to one aspect of the present invention is a method of assessing a probe by measuring a known sample whose shape is known with the probe in an SPM, a groove part being formed on a surface of the known sample, the groove part having a shape tapered toward a bottom of the groove part;
the method comprising the steps of:
measuring a width of the groove part at a position away from a measurement point on the bottom of the groove part in a depth direction by a predetermined distance;
comparing the width of the groove part with a threshold value; and
determining that the probe is satisfactory when the width is less than the threshold value and determining that the probe is unsatisfactory when the width is equal to or greater than the threshold value.
According to the method as recited in the above-described Item 2, it is possible to assess the probe without increasing the arithmetic processing amount.
(Item 3)
A method of assessing a probe by measuring a known sample whose shape is known with the probe in an SPM, a plurality of projection parts being formed on a surface of the known sample, each of the plurality of projection parts having a shape tapered toward a vertex thereof,
the method comprising the steps of:
measuring a width of each of the plurality of projection parts at a position away from a measurement point of the vertex in a height direction by a predetermined distance;
comparing the width of each of the plurality of projection parts with a threshold value; and
determining that the probe is satisfactory when a ratio of a number of the projection parts whose width is less than the threshold value to a number indicated by the plural is equal to or greater than a predetermined value and determining that the probe is unsatisfactory when the ratio is less than the predetermined value.
According to the method as recited in the above-described Item 3, it is possible to assess the probe without increasing the arithmetic processing amount. Furthermore, it is possible to reduce the variation in the measured width, which in turn can improve the assessment accuracy.
(Item 4)
A method of assessing a probe by measuring a known sample whose shape is known in an SPM, a plurality of groove parts being formed on a surface of the known sample, and each of the plurality of groove parts having a shape tapered toward a bottom,
the method further comprises the steps of:
measuring a width of each of the plurality of groove parts at a position away from a measurement point of the bottom in a depth direction by a predetermined distance;
comparing the width of each of the plurality of groove parts with a threshold value; and
determining that the probe is satisfactory when a ratio of a number of groove parts whose width is less than the threshold value to a number indicated by the plural is equal to or greater than a predetermined value and determining that the probe is unsatisfactory when the ratio is less than the predetermined value.
According to the method as recited in the above-described Item 4, it is possible to assess the probe without increasing the arithmetic processing amount. Furthermore, it is possible to reduce the variation in the measured width, which in turn can improve the assessment accuracy.
[Item 5]
In the method as recited in any one of the above-described Items 1 to 4, the threshold value is set according to the type of the probe.
According to the method as recited in the above-described Item 5, it is possible to assess the probe by the threshold value corresponding to the type of the probe.
[Item 6]
The method according to any one of the above-described Items 1 to 5, the threshold value is set by the user according to a type of the probe.
According to the method as recited in the above-described Item 6, it is possible to assess the probe by a threshold value desired by the user.
(Item 7)
In the method according to any one of the above-described Items 1 to 6, the method further comprises a step of causing a display device to display a determination result in the determining step.
According to the method as recited in the above-described Item 7, it is possible to make the user recognize the assessment result by making the user visually recognize the display device.
(Item 8)
A SPM according to one aspect of the present invention comprises:
an observation device having a probe; and
an information processing device,
wherein the observation device is configured to measure a known sample whose shape is known with the probe and output a measurement signal indicating a result of the measurement to the information processing device, a projection part being formed on a surface of the known sample, the projection part having a shape tapered toward a vertex thereof, wherein the information processing device is configured to measure a width of the projection part at a position away from the measurement point of the vertex in a height direction by a predetermined distance, compare the width with a threshold value, and determine that the probe is satisfactory when the width is less than the threshold value and determine that the probe is unsatisfactory when the width is equal to or greater than the threshold value.

According to the SPM as recited in the above-described Item 8, it is possible to assess the probe without increasing the arithmetic processing amount.

(Item 9)

An SPM according to one aspect of the present invention comprising:

an observation device having a probe; and an information processing device, wherein the observation device is configured to measure a known sample whose shape is known with the probe and output a measurement signal indicating a result of the measurement to the information processing device, a groove part being formed on a surface of the known sample, the groove part having a shape tapered toward a bottom, and wherein the information processing device is configured to measure a width of the groove part at a position away from the measurement point of the bottom in a depth direction by a predetermined distance, and compare the width with a threshold value; and determine that the probe is satisfactory when the width is less than the threshold value and determine that the probe is unsatisfactory when the width is equal to or greater than the threshold value.

According to the SPM as recited in the above-described Item 9, it is possible to assess the probe without increasing the arithmetic processing amount.

(Item 10)

An SPM comprising:

an observation device having a probe; and an information processing device, wherein the observation device is configured to measure a known sample whose shape is known with the probe and output a measurement signal indicating a result of the measurement to the information processing device, a plurality of projection parts being formed on a surface of the known sample, each of the plurality of projection parts having a shape tapered toward a vertex thereof, and wherein the information processing device is configured to measure a width of each of the plurality of projection parts at a position away from of the measurement point of the vertex in a height direction by a predetermined distance, compare the width of each of the plurality of projection parts with a threshold value, and determine that the probe is satisfactory when a ratio of the number of projection parts whose width is less than the threshold value to the number indicated by the plurality is equal to or greater than a predetermined value and determining that the probe is unsatisfactory when the ratio is less than the predetermined value.

According to the SPM as recited in the above-described Items 10, it is possible to assess the probe without increasing the arithmetic processing amount and further reduce the variation in measured width, which in turn can improve the assessment accuracy.

[Item 11]

An SPM comprising:

an observation device having a probe; and an information processing device, wherein the observation device is configured to measure a known sample whose shape is known with the probe and output a measurement signal indicating a result of the measurement to the information processing device, a plurality of groove parts being formed on a surface of the known sample, each of the plurality of groove parts having a shape tapered toward a bottom thereof, and wherein the information processing device is configured to measure a width of each of the plurality of groove parts at a position away from a measurement point of the bottom in a depth direction by a predetermined distance, compare the width of each of the plurality of groove parts with a threshold value, and determine that the probe is satisfactory when a ratio of a number of the groove parts whose width is less than the threshold value to a number indicated by the plurality is equal to or greater than a predetermined value and determine that the probe is unsatisfactory when the ratio is less than the predetermined value.

According to the SPM as recited in the above-described Item 11, it is possible to assess the probe without increasing the arithmetic processing amount. Further, it is possible to reduce the variation in the measured width, which in turn can improve the assessment accuracy.

The embodiments disclosed herein are intended to be implemented in combination as appropriate without technical contradiction, and it should be understood that the embodiments disclosed herein are illustrative and non-restrictive in all respects. The scope of this embodiment is indicated not by the above-described embodiments but by the scope of claims, and is intended to include all modifications within the meaning and scope equivalent to the scope of claims.

DESCRIPTION OF REFERENCE SYMBOLS

1: Optical system
2: Cantilever
3: Probe
3A: Tip
3H: Highest point
3L: Lowest point
3S: Trajectory
4: holder
5: Beam splitter
6: Laser light source
7: Mirror
8: Photodetector
10: Scanner
12: Sample holder
16: Drive unit
17: Computation unit
18: Control unit
20: Information processing device
26: Display device
28: Input device
80: Observation device
162: ROM

164: RAM
200: Projection part
200A: Vertex
300: Groove part
300A: Bottom
302: First input unit
304: Generation unit
306: Measurement unit
308: Assessment unit
310: Second input unit
312: Storage unit
500: Surface

The invention claimed is:

1. A method of assessing a probe by measuring a known sample whose shape is known with the probe in an SPM (Scanning Probe Microscope), the known sample having at least one projection part on a surface thereof, the projection part having a shape tapered toward a vertex thereof, the method comprising the steps of:

measuring a circle equivalent radius of a circle, the circle being defined by approximating a cross-section of the projection part at a position away from a measurement point of the vertex in a height direction by a predetermined distance to a circle;

comparing the circle equivalent radius with a threshold value, and determining that the probe is satisfactory when the circle equivalent radius is less than the threshold value and determining that the probe is unsatisfactory when the circle equivalent radius is equal to or greater than the threshold value.

2. The method as recited in claim 1, wherein a plurality of the projection parts is formed on a surface of the known sample, wherein each of the plurality of projection parts has a shape tapered toward a vertex thereof, wherein the measuring step includes a step of measuring a circle equivalent radius of a circle, the circle being defined by approximating a cross-section of each of the plurality of projection parts at a position away from a measurement point of the vertex in a height direction by a predetermined distance to a circle, wherein the comparing step includes a step of comparing the circle equivalent radius of each of the plurality of projection parts with a threshold value, and wherein the determining step includes a step of determining that the probe is satisfactory when a ratio of a number of the projection parts whose circle equivalent radius is less than the threshold value to a number indicated by the plural is equal to or greater than a predetermined value and determining that the probe is unsatisfactory when the ratio is less than the predetermined value.

3. The method as recited in claim 1, wherein the threshold value is set according to a type of the probe.

4. The method as recited in claim 1, wherein the threshold value is set by a user.

5. The method as recited in claim 1, further comprising a step of causing a display device to display a determination result in the determining step.

6. The method as recited in claim 1, wherein the circle equivalent radius is a value reflecting a curvature radius of the probe.

7. A method of assessing a probe by measuring a known sample whose shape is known with the probe in an SPM (Scanning Probe Microscope), at least one groove part being formed on a surface of the known sample, the groove part having a shape tapered toward a bottom of the groove part;

the method comprising the steps of:

measuring a circle equivalent radius of a circle, the circle being defined by approximating a cross-section of the groove part at a position away from a measurement point on the bottom of the groove part in a depth direction by a predetermined distance to a circle;

comparing the circle equivalent radius of the groove part with a threshold value; and determining that the probe is satisfactory when the circle equivalent radius is less than the threshold value and determining that the probe is unsatisfactory when the circle equivalent radius is equal to or greater than the threshold value.

8. The method as recited in claim 7, wherein a plurality of groove parts is formed on a surface of the known sample, wherein each of the plurality of groove parts has a shape tapered toward a bottom thereof, wherein the measuring step includes a step of measuring a circle equivalent radius of a circle, the circle being defined by approximating a cross-section of each of the plurality of groove parts at a position away from a measurement point of the bottom in a depth direction by a predetermined distance to a circle, wherein the comparing step includes a step of comparing the circle equivalent radius of each of the plurality of groove parts with a threshold value, and wherein the determining step includes a step of determining that the probe is satisfactory when a ratio of a number of groove parts whose circle equivalent radius is less than the threshold value to a number indicated by the plural is equal to or greater than a predetermined value and determining that the probe is unsatisfactory when the ratio is less than the predetermined value.

9. The method as recited in claim 7, wherein the circle equivalent radius is a value reflecting a curvature radius of the probe.

10. An SPM (Scanning Probe Microscope) comprising:

an observation device having a probe; and an information processing device, wherein the observation device is configured to measure a known sample whose shape is known with the probe and output a measurement signal indicating a result of the measurement to the information processing device, wherein at least one projection part is formed on a surface of the known sample, wherein the projection part has a shape tapered toward a vertex thereof, wherein the information processing device is configured to execute measuring processing of measuring a circle equivalent radius of a circle, the circle being defined by approximating a cross-section of the projection part at a position away from a measurement point of the vertex in a height direction by a predetermined distance to a circle, execute comparing processing of comparing the circle equivalent radius with a threshold value, and execute determining processing of determining that the probe is satisfactory when the circle equivalent radius is less than the threshold value and determine that the probe is unsatisfactory when the circle equivalent radius is equal to or greater than the threshold value.

11. The SPM as recited in claim 10,
wherein a plurality of projection parts is formed on a surface of the known sample,
wherein each of the plurality of projection parts has a shape tapered toward a vertex thereof, and
wherein the information processing device is configured to
execute processing of measuring a circle equivalent radius of a circle as the measuring processing, the circle being defined by approximating each of the plurality of projection parts at a position away from a measurement point of the vertex in a height direction by a predetermined distance to a circle,
execute processing of comparing the circle equivalent radius of each of the plurality of projection parts with a threshold value, as the comparing processing, and
execute processing of determining that the probe is satisfactory when a ratio of a number of projection parts whose circle equivalent radius is less than the threshold value to a number indicated by the plural is equal to or greater than a predetermined value and determine that the probe is unsatisfactory when the ratio is less than the predetermined value, as the determining processing.

12. The SPM as recited in claim 10,
wherein the circle equivalent radius is a value reflecting a curvature radius of the probe.

13. An SPM (Scanning Probe Microscope) comprising:
an observation device having a probe; and
an information processing device,
wherein the observation device is configured to measure a known sample whose shape is known with the probe and output a measurement signal indicating a result of the measurement to the information processing device, a groove part being formed on a surface of the known sample, the groove part having a shape tapered toward a bottom thereof, and
wherein the information processing device is configured to
execute measuring processing of measuring a circle equivalent radius of a circle, the circle being defined by approximating a cross-section of the groove part at a position away from a measurement point of the bottom in a depth direction by a predetermined distance to a circle, and
execute comparing processing of comparing the circle equivalent radius with a threshold value, and
execute determining processing of determining that the probe is satisfactory when the circle equivalent radius is less than the threshold value and determine that the probe is unsatisfactory when the circle equivalent radius is equal to or greater than the threshold value.

14. The SPM as recited in claim 13,
wherein a plurality of groove parts is formed on a surface of the known sample,
wherein each of the plurality of groove parts has a shape tapered toward a bottom thereof, and
wherein the information processing device is configured to
execute processing of measuring a circle equivalent radius of a circle, the circle being defined by approximating each of the plurality of groove parts at a position away from a measurement point of the bottom in a depth direction by a predetermined distance to a circle, as the measuring processing,
execute processing of comparing the circle equivalent radius of each of the plurality of groove parts with a threshold value, as the comparing processing, and
execute processing of determining that the probe is satisfactory when a ratio of a number of the groove parts whose circle equivalent radius is less than the threshold value to a number indicated by the plural is equal to or greater than a predetermined value and determine that the probe is unsatisfactory when the ratio is less than the predetermined value, as the determining processing.

15. The SPM as recited in claim 13,
wherein the circle equivalent radius is a value reflecting a curvature radius of the probe.

* * * * *